United States Patent [19]
Bisson et al.

[11] Patent Number: 4,723,496
[45] Date of Patent: Feb. 9, 1988

[54] SEWING MACHINE WITH ELECTRONIC CONTROL DEVICE FOR THE NEEDLE DRIVING MOTOR

[75] Inventors: Flavio Bisson, Cava Manara; Giacomo Cattaneo, Pavia, both of Italy

[73] Assignee: NECCHI Societa per Azioni, Pavia, Italy

[21] Appl. No.: 52,366

[22] Filed: May 21, 1987

[30] Foreign Application Priority Data

Jun. 13, 1986 [IT] Italy .................................. 42911 A/86

[51] Int. Cl.⁴ .............................................. D05B 69/22
[52] U.S. Cl. ..................................................... 112/275
[58] Field of Search ................... 112/275, 277, 67, 87, 112/220

[56] References Cited

U.S. PATENT DOCUMENTS 4,233,919 11/1980 Takahashi et al. ............. 112/275 X
4,586,448 5/1986 Lerch et al. ......................... 112/275

Primary Examiner—Peter Nerbun
Attorney, Agent, or Firm—Stevens, Davis, Miller & Mosher

[57] ABSTRACT

An electronic control device for the needle driving motor in a sewing machine, comprising an electronic circuit which employs logic gates to obtain a simple, reliable and cheap control device.

6 Claims, 1 Drawing Figure

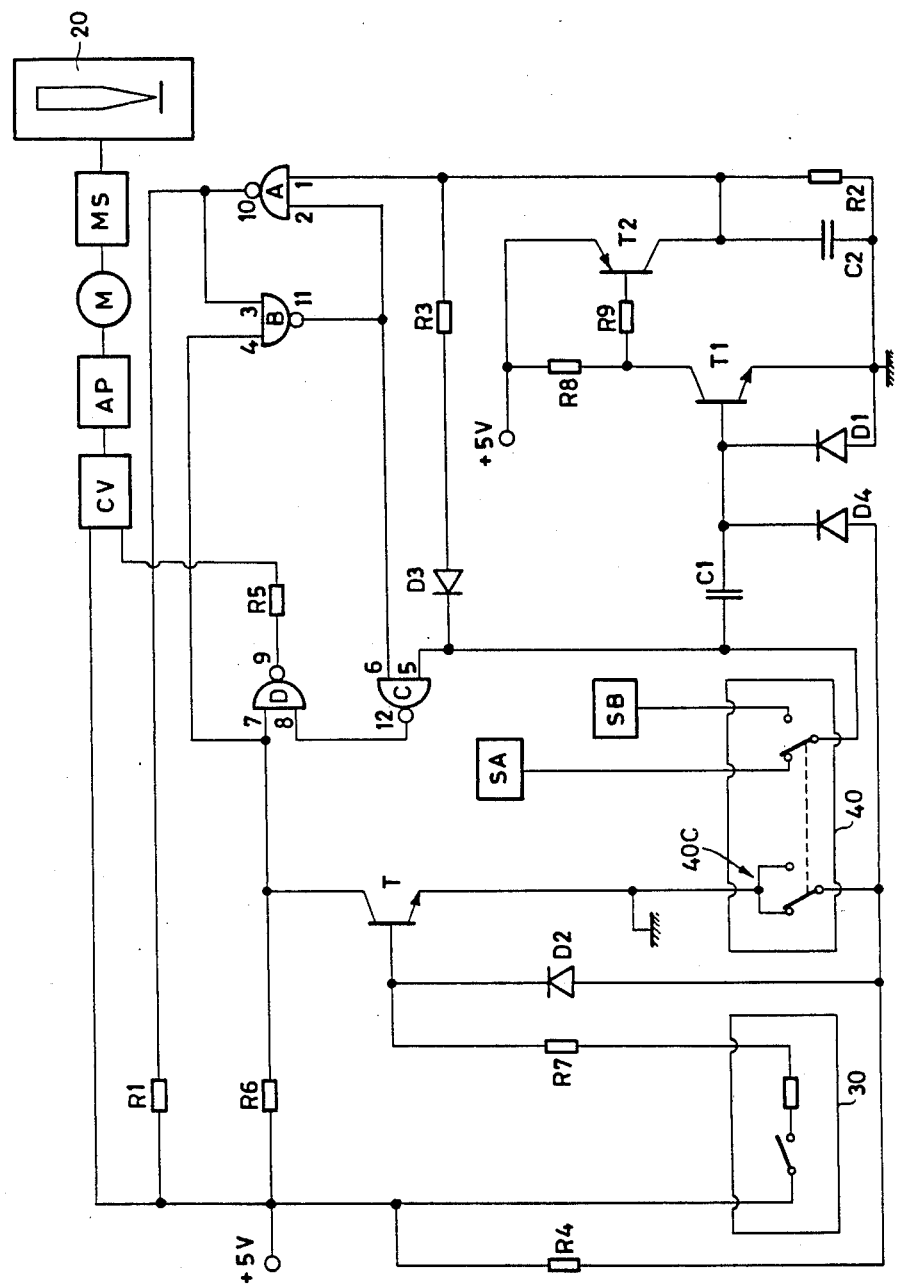

SEWING MACHINE WITH ELECTRONIC CONTROL DEVICE FOR THE NEEDLE DRIVING MOTOR

Background of the Invention

The present invention relates to a sewing machine with an electronic control device for the sewing needle driving motor.

Sewing machines are provided with a motor which, via a kinematic chain, drives with reciprocating movement a sewing needle between an extremely high position and an extremely low position (hereinafter simply indicated as high and low position). The sewing machine is usually provided with an external regulator with which, when the machine is started by a general external switch, the operator controls the driving of the motor from a zero speed to a maximum speed. Some types of sewing machines comprise moreover externally a needle stop position selector with two positions corresponding to the stop of the needle respectively in the high and low position. These types of sewing machines contain also an internal switch which is activated when the operator mechanically disengages the sewing needle from the motor. In the inside of the above-mentioned types of sewing machines there is present a motor control electronic circuit operatively connected to the regulator, to the position selector and to the internal switch. The control circuit also is connected to two position sensors operatively connected to the kinematic chain between the motor and the needle. One position sensor indicates to the control circuit when the needle is in its high position while the other position sensor indicates to the control circuit when the needle is in its low position.

It has to be noted that when the operator mechanically disengages the sewing needle from the motor, the two position sensors deactivate.

These sewing machines have four main working conditions:

(1) Sewing: the motor, controlled by the regulator, turns continually, independently from the signals arriving from the position sensors;

(2) Needle positioning when the regulator is placed in the zero speed position of the motor; the motor stops the needle in the position (high or low) indicated by the position selector; when the machine is stopped, it is possible to move the needle out of position by acting manually on the hand wheel;

(3) Execution of the bobbin winding: the motor is mechanically disengaged from the needle and, as known, the motor is only used in order to wind the thread coming from a spool onto the bobbin obviously acting on the regulator; in this case the motor stops as soon as the regulator is released;

(4) Needle positioning in high or low position: when the machine is motionless, operating on the position selector, the needle is displaced in one or the other of the two positions. The mentioned control circuit operates in such a way that the sewing can give the above-cited performances opportunely coordinating the various elements with which the control circuit is connected.

There are also simpler sewing machines not provided with the position selector and with the two position sensors, but provided only with a position sensor which indicates the reaching of the high position of the needle. These simpler sewing machines have only three of the four above mentioned working conditions. The fourth listed working condition is obviously lacking, and the simpler sewing machines also provided with an electronic control circuit which assures the correct performance of the machine in the three working conditions. Also in these sewing machines, when the operator mechanically disengages the sewing machines, when the operator mechanically disengages the sewing needle from the motor, the only position sensor deactivates. Obviously in the second listed working condition the motor stops the needle in the high position. In the above mentioned sewing machines, with or without a position selector, the control circuit is almost always complicated. This results in smaller reliability and a higher cost of the circuit itself and thus of the sewing machine. Moreover, with reference to the execution of the bobbin winding, such control circuit needs, for its working, the above mentioned internal switch driven at the mechanical disengagement of the sewing needle from the motor. This involves the employment of an added element for the sewing machine which changes furthermore the reliability and the cost of the machine itself.

SUMMARY OF THE INVENTION

It is an object of the present invention to provide a sewing machine with an electronic device for controlling the various functions of the machine which overcomes the above mentioned drawbacks. Such an object is achieved by a sewing machine comprising a motor for reciprocating a sewing needle between a first and a second extreme position, a motor speed regulator for obtaining a zero speed and a maximum speed, first sensor means sending a control electric signal respectively when the needle is in one of said first and second extreme positions, first means being provided, of the logic gate type, with a first and a second input and an output, which commutate from a first and a second logic condition and vice versa, i.e., a first logic condition in which at its output an electric signal is present which controls the starting of the motor and a second logic condition in which at its output an electric signal is present which controls the stopping of the motor. The first input of the first logic gate means is operatively connected to the regulator in such a way that when the regulator is in its motor starting position the first logic gate means are in their first logic condition and when the regulator is in its motor stopping position, the first logic gate means commutate from one to the other of their two logic conditions according to the logic level present at their second input. Second means are moreover provided of the logic gate type having a first and a second input and an output, the output of the second means being connected to the second input of the first logic gate means, the second logic gate means commutating from a first to a second logic condition and vice versa, the commutation of the second logic gate means from one to the other of their two logic conditions causing the commutation of the first logic gate means from one to the other of its two logic conditions when the regulator is in the motor stopping position. The first sensor means is operatively connected to the first input of the second logic gate means, control means being connected to the second input of the second logic gate means in order to carry the second logic gate means in the commutation condition when the regulator is in the motor starting position, and when the regulator is in the motor stopping position and until the sending of the control signal, and for carrying the second logic gate means to the non-commutation condition when the regulator is in the motor stopping condition, and, once this control signal has been sent, the control signal, when the regulator is in the motor stopping position, causing the commutation of the second logic gate means from one logic condition to the other in such a way as to cause the commutation of the first logic gate means to the logic condition corresponding to the stopping of the motor.

BRIEF DESCRIPTION OF THE DRAWINGS

In order to understand the characteristics and advantages of the present invention, a description of one exemplifying, non-limitative embodiment is hereinafter given, illustrated in the only accompanying drawing in which is schematically shown the control device for the driving motor of a needle of a sewing machine according to the invention.

DESCRIPTION OF THE PREFERRED EMBODIMENT

The sewing machine referred to in the following description is of the common type comprising in its structure a bed from which a standard laterally rises, and from which, in turn, a bracket arm extends ending with a head supporting the sewing means, needle bar and needle. Such a sewing machine is not illustrated in its structure because of being of the known type. In the figure only some components of the sewing machine are schematically illustrated. A block 20 schematizes the sewing needle and with the motor M which, via an apposite known kinematic chain, reciprocates the needle 20 between an extremely high and an extremely low position. An external foot rheostat (regulator 30) regulates the speed of the motor between a zero value and a maximum value. An external needle stop position selector 40 is indicated with two positions corresponding to the stop of the needle 20 respectively in a high and in a low position. Block MS indicates known means for mechanically disengaging the needle 20 from the motor M.

In the figure there is thus primarily ilustrated the device which controls the motor M on the basis of the information coming to it from the foot rheostat 30 and a selector 40.

The device provides principally two needle position sensors SA and SB connected to the selector 40. The sensors SA and SB emit a particular electric signal, as it will be afterward explained, when the needle 20 is respectively in the high and low position (i.e. the sensor SA for the high position and the sensor SB for the low position). Such sensors may be of the Hall Effect type operatively connected to a shaft comprised in the kinematic chain connecting the motor M to the needle 20 according to known art.

When the needle 20 is mechanically disengaged from the motor M trough the means MS, even the shaft is disengaged from the motor M and thus the sensors SA and SB deactivate.

A secondary reference electronic circuit CV of known type, is moreover provided, for the control of the speed of the needle 20, whose input is connected to the foot controller 30 and whose output is connected to a power amplifier AP which feeds the motor M. When the foot controller 30 is in a position of the speed of the motor M different from zero (closed position), the secondary circuit CV does not operate and the motor M turns at the speed determined by the foot controller itself. When the foot controller 30 is in the zero speed position of the motor M (open position), the secondary circuit CV supplies a suitable signal to the power amplifier AP in such a way that the speed of the motor M is a fixed speed, corresponding to a speed of the needle 20 which is much lower than the operative speeds for the reasons which will be clarified subsequently.

The control device of the motor M provides moreover a set of electronic components operatively connected to the foot controller 30, to the selector 40 and, through selector 40, to the sensors SA and SB, and at last to the secondary circuit CV as shown in the figure. The above-mentioned electronic components are formed by:

a set of logic gates A, B, C, D of the NAND type with inputs and outputs indicated with the numbers 1-12;
three transistors T, T1, T2;
four diodes D1, D2, D3, D4;
two capacitors C1, C2; and
a set of resistances R1, R2, R3, R4, R5, R6, R7, R8, R9.

The circuit formed by the above-listed electronic components is fed by a principal direct voltage source of +5 volt. It has to be noted that the logic gates A and B and their connections form a bistable multivibrator, while the two transistors T1, T2 and their connections form a monostable multivibrator. The monostable multivibrator is connected to a secondary direct tension source of +5 volt.

The working of the control device will be described hereinafter, illustrated with reference to the four main conditions of the sewing machine working indicated hereinbefore.

(1) Sewing

By pressing and thus bringing into a closed position the foot controller 30, the transistor T conducts and establishes a low logic level at the input 7 of the gate D. An electric signal will be present at the output 9 of the gate D (hereinafter the word "signal" will be simply used for indicating an electric signal) of high logic level (i.e. the output 9 will be at high logic level) independently from the logic level of the signal arriving at the input 8 of the same gate D. The output 9 of the gate D is connected to a particular input of the secondary circuit CV in such a way that, when a low logic level signal arrives at this input, the power amplifier AP does not feed the motor M and when, on the contrary, a high logic level signal arrives at the input, the power amplifier AP feeds the motor M. Thus in the above described situation, with high logic level signal at the output 9 of the gate D, the amplifier AP feed the motor M and motor M turns at the speed determined by the foot controller 30.

(2) Positioning of the Needle When the Foot Controller is released

It must be stated in advance, that the needle position sensors SA and SB, one or the other of them, depending on the position of the selector 40, is connected to the input 5 of the gate C, emits a low logic level signal when the needle 20 passes into the position detected by them. In all the other positions of the needle 20 these sensors emit a high logic level signal. It must moreover be stated in advance, that one or the other of the two sensors SA and SB, depending ever on the position of the selector 40, is connected, through the capacitor C1, to the monostable multivibrator. At each passage of the connected sensor from the low logic level (needle in high or low position, depending on the connected sensor) to the high level (needle in all the other positions)

the capacitor C1 transmits an impulse to the base of the transistor T1 causing the transistor T1 to conduct. The transistor T1, in turn, pilots the transistor T2 which causes immediately the charging of the capacitor C2. The capacitor C2 discharges rapidly, through the resistance R3 and the diode D3 connected to the sensor, every time the sensor reaches the low logic level, (i.e. when the needle reaches the high or low position), depending on the connected sensor. That being stated, when the foot controller 30 is released (i.e., it is carried in the open position as illustrated in the figure), it must be said in the first place, as previously explained, that, through the secondary circuit CV, a predetermined speed corresponding to a speed of the needle 20 much lower than the normal operative speed is established for the motor M. The releasing of the foot controller 30 causes the transistor T not to conduct and a high logic level will be present at the input 7 of the gate D and at the input 4 of the gate B. The output 9 of the gate D will be at a high or low logic level and thus the motor M will turn or not, depending on the logic level of the input 8 of the gate D. If such level is low the motor M turns, otherwise it will stop. The logic level at the input 8 of the gate D depends upon the logic level at the inputs 5 and 6 of the gate C and thus on the logic level at the output 11 of the gate B and at the connected sensor, which in the illustrated scheme is the high position sensor of the needle. If the needle 20 is in a position different from its high position, for the reasons above explained, a high logic level is present at the input 5 of the gate C, and a high logic level is also present at its input 6. The high logic level at the input 6 is explained from the fact that, before the foot controller 30 is released, a high logic level is present at the output 11 of the gate B and thus at the input 2 of the gate A, as the logic level at the input 4 of the gate B is low. When the foot controller 30 is released, if the needle 20 is in a position different from its high position (sensor SA at high logic level) the capacitor C2 is charged and thus the input 1 of the gate A is at a high logic level. Consequently, a low logic level is present at the output 10 of the gate A and thus at the input 3 of the gate B, independently from the fact that the input 4 of the gate B passes from a low logic level to a high logic level. In such a situation a low logic level is present at the output 12 of the gate C and the motor M continues to turn. When the needle 20 reaches it superior position, the sensor SA supplies a low logic level signal to the input 5 causing the commutation of the gate C, whose output 12 reaches the high logic level and as a consequence the motor M stops. Substantially, when the foot controller 30 is released, the needle 20 passes from its operative speed to a much lower speed and stops when it has reached its superior position. The passage of the needle 20 from its operative speed to a much lower speed is necessary. In fact, if, on the contrary, it maintained its operative speed, it would not stop in its superior position, but it would continue to rotate due to the inertia. Obviously, if the selector 40 is displaced on the sensor SB, the control device works in the same above examined way with the difference that the stopping of the motor M occurs when the needle 20 is in its low position. When the needle 20 has reached its superior position (or its inferior one if the selector 40 is displaced on the sensor SB) the capacitor C2, for the reasons above explained, discharges rapidly and the input 1 of the logic gate A reaches the low logic level. As a consequence, the output 10 of the gate A reaches the high logic level, the output 11 of the gate B reaches the low logic level and the gate C does not commutate any more, but remains with a high logic level at the output 12, independently from the signal which the sensor supplies to the input 5 of the same gate C. The gate 5 will be able to commutate again only when the input 4 of the gate B reaches the low logic level. In other words the motor M remains motionless until the foot controller 30 is pressed again. Thus in this situation with the motor M stopped and the foot controller 30 released, it is possible to move the needle out of its position, manually acting on the hand wheel, without the motor M starting, in fact, as it is above said, the gate C does not commutate. Obviously, the discharge of the condenser C2 must be rapid enough to carry the gate C in the above condition of non commutation before the needle 20 may be manually displaced and avoiding the starting of the motor M again. Vice versa, when the foot controller 30 is released, the discharge of the condenser must not be very rapid so that the gate C remains in the commutation position until the needle 20 has not reached its superior position (or the inferior one if the selector 40 is displaced on the sensor SB). All this comports a particular choice of the characteristic parameters of the circuit components and of the resulting circuit. The choice is however at the level of everybody skilled in the art.

(3) Execution of the bobbin winding

By the disengaging means, the needle 20 is disengaged from the motor M, and in the meantime also the position sensors SA and SB are disengaged from the motor M. When the foot controller 30 is pressed, the control device working is the one already explained in point 1) and the motor M causes the needle 20 to move at the operative speed established by the same foot controller. When the foot controller 30 is released, the working logic of the control device is that shown in point (2), in this case, however, the monostable multivibrator, as it does not receive control impulses from the connected sensor, remains in the inoperative condition and thus a high logic level is present at the input 3 of the gate B. The stopping of the motor M occurs then when the transistor T does not conduct any more at the release of the foot controller, 30, as it is required in this operative condition of the sewing machine.

(4) Needle Positioning in High or Low Position When the Machine is Motionless

When the selector 40 is displaced from the position shown in the figure, corresponding to the stop of the needle 20 in the high position, to the position corresponding to the stop of the needle 20 in the low position, the following occurs. During the passage of the selector 40 from one position to the other, a high logic level signal is supplied to the two transistors T and T1 through the diodes D2 and D4, respectively.

This is obtained through a mobile contact of the selector 40, indicated by 40C, which in the two positions of the selector, corresponding to the stopping of the needle in the high and low position closes a connection to the mass in order to discharge to the mass the electric signal fed to the two lines connected to the transistors T and T1 and relative to the two diodes D2 and D4, through the main source of direct voltage and via the resistance R4. In all the other passage positions of the selector 40, the mobile contact opens the above mentioned connection to the mass. The high logic level supplied to the transistors T and T1 causes them to conduct during all the passage time of the selector 40.

From that the following events occur: the starting of the motor M, the positioning of the gate C in a commutation condition and the activation of the monostable multivibrator with the effect of a high logic level at the input 1 of the gate A.

When the selector 40 is in the position corresponding to the stopping of the needle in the low position, there is a situation equivalent to the situation of releasing of the foot controller 30 and thus the working of the control device is that described in point (2). The motor M will stop when the needle 20 has reached its low position. Displacing the selector 40 from the position of needle stopping in the low position to the position of needle stopping in the high position, there is the same working of the control device above seen with the obvious difference that the motor M will stop when the needle 20 has reached its high position.

From what has been described and illustrated it can be understood how the control device is simple either as a circuit structure or as a working mode. Such a control device does not require, with reference to the execution of the bobbin winding, the use of an internal switch as required by the known devices. The problem of the motor control in the execution of the bobbin winding is solved with reference to the circuit by the combined action of the monostable multivibrator, of the capacitor C2 and of the bistable multivibrator. The simplicity assures the reliability of the circuit and permits low production costs for the same. The reliability is increased by the use of logic gates. In fact, as it is known, the characteristics of the binary working of the logic gates give particular operative reliability to a circuit which uses them, permitting, moreover, to avoid that fluctuation in the feed voltage and in the internal voltage of the circuit, obviously within certain limits, influencing the working of the same circuit.

With obvious modifications a position selector with many positions can be utilized and, correspondingly, also many position sensors, in order to stop the needle in positions intermediate with respect to the extreme positions already examined. The working principle is completely similar to the one already considered. The illustrated circuit is designed for sewing machines provided with a position selector.

With simplification such a circuit may be employed in sewing machines not provided with a position selector and with two corresponding sensors, but provided only with a sensor for the high position of the needle, mention of which was made in the introductory part of this description. It is enough in substance to eliminate the lines relative to the diodes D2 and D4 and connected to the transistors T and T1 and to connect directly the position sensor to the input 5 of the gate C.

For the working of this simplified circuit with reference to the principal working conditions above described, the following has to be observed:

(1) Sewing

The working of the simplified circuit is that above described for the illustrated circuit.

NEEDLE POSITIONING AT THE RELEASING OF THE FOOT CONTROLLER

The working of the simplified circuit is that above described for the illustrated circuit, keeping in account that the stopping of the motor occurs only when the needle is in the high position.

EXECUTION OF THE BOBBIN WINDING

The working of the simplified circuit is that above described, because also in this case, disengaging the needle from the motor, the only sensor too is in the meantime disengaged from the motor. Obviously, the condition (4) does not exist, because the position selector is missing.

We claim:

1. A sewing machine comprising a motor for reciprocating a sewing needle between a first and a second extreme position;
   a motor speed regulator for obtaining a zero speed and a maximum speed;
   first sensor means sending a control electric signal respectively when the needle is in one of said first and second extreme positions;
   first means of the logic gate type with a first and second input and an output, which commutate from a first to a second logic condition and vice versa, said first logic condition in which at its output an electric signal is present controlling the starting of the motor and a second logic condition in which at its output an electric signal is present controlling the stopping of the motor, the first input of said first logic gate means being operatively connected to said regulator in such a way that when the regulator is in its motor starting position, said first logic gate means is in its first logic condition and when said regulator is in its motor stopping position, said first logic gate means commutates from one to the other of its two logic conditions according to the logic level present at its second input;
   second means of the logic gate type having a first and a second input and an output, the output of said second means being connected to the second input of said first logic gate means, said second logic gate means commutating from a first to a second logic condition and vice versa, the commutation of said second logic gate means from one to the other of its two logic conditions causing the commutation of said first logic gate means from one to the other of its two logic conditions when said regulator is in the motor stopping position, said first sensor means being operatively connected to the first input of said second logic gate means;
   control means connected to the second input of said second logic gate means in order to carry said second logic gate means in the communtation condition when said regulator is in the motor starting position, and when said regulator is in the motor stopping position and until the sending of said control signal, and for carrying said second logic gate means to the non-commutation condition when said regulator is in the motor stopping condition, and, once this control signal has been sent, said control signal, when the regulator is in the motor stopping position, causing the commutation of said second logic gate means from one logic condition to the other in such a way as to cause the commutation of said first logic gate means to the logic condition corresponding to the stopping of the motor.

2. The sewing machine according to the claim 1, including a position selector with at least two positions for causing the motor to stop the needle at least either in the first or in the second extreme position, and at least a second sensor means supplying a control electric signal when the needle is in the other of said first and second extreme positions, said first and second sensor means being operatively connected to the first input of said second logic gate means through the selector, said selector directly operating the connection between either the one or the other of said first and second sensor means, depending from its position, and said first input of said second logic gate means, said control means carrying said first logic gate means in the first logic condition when said selector is in an intermediate position between its two positions corresponding to the needle stopping extreme positions.

3. The sewing machine according to the claim 1, including transistor means which connect said regulator to said first logic gate means, said regulator for starting or stopping the motor, according to its position, piloting the transistor means either in a conducting condition or in a non-conducting condition, said transistor means controlling the feeding of a voltage source to said first logic gate means for carrying it either in its first logic condition or in the commutation condition from one logic condition to the other.

4. The sewing machine according to the claim 2 including transistor means which connect said regulator to said first logic gate means, said regulator for starting or stopping the motor, according to its position, piloting the transistor means either in a conducting condition or in a non-conducting condition, said transistor means controlling the feeding of a voltage source to said first logic gate means for carrying it either in its first logic condition or in the commutation condition from one logic condition to the other, said control means comprising a mobile contact of the selector, said mobile contact, in said intermediate position of the selector, causing the supply of a signal to said transistor means for carrying it in one of the two conducting or non-conducting positions corresponding to the condition of a first logic state of said first logic gate means.

5. The sewing machine according to claim 4, in which said control means comprise a bistable multivibrator connected to the second input of said second logic gate means and piloted by said regulator and including capacitor means whose connection to a voltage source is controlled by a monostable multivibrator piloted by the control signal of one said first and second sensor means, said regulator piloting said bistable multivibrator causing it to assume a first state in which the bistable multivibrator supplies a logic signal to said second logic gate means for keeping it in said condition of non commutation, said capacitor means piloting said bistable multivibrator for causing it to assume a second state in which the bistable multivibrator supplies a logic signal to said second logic gate means for keeping it in commutation condition.

6. The sewing machine according to claim 2 including transistor means which connect said regulator to said first logic gate means, said regulator for starting or stopping the motor, according to its position, piloting the transistor means either in a conducting condition or in a non-conducting condition, said transistor means controlling the feeding of a voltage source to said first logic gate means for carrying it either in their first logic condition or in the commutation condition from one logic condition to the other, said control means comprising a bistable multivibrator connected to the second input of said second logic gate means and piloted by said regulator and by capacitor means whose connection to a voltage source is controlled by a monostable multivibrator piloted by the control signal of one of said first and second sensor means, said regulator piloting said bistable multivibrator causing it to assume a first state in which the bistable multivibrator supplies a logic signal to said second logic gate means for keeping it in said condition of non commutation, said capacitor means piloting said bistable multivibrator for causing it to assume a second state in which the bistable multivibrator supplies a logic signal to said second logic gate means for keeping it in said commutation condition, said control means comprising a mobile contact of the selector, said mobile contact, in said intermediate position of the selector, causing the supply of a signal to said transistor means for carrying it in one of the conducting or non-conducting conditions corresponding to the condition of a first logic state of said first logic gate means and causing the supply of a signal to said monostable multivibrator for carrying the monostable multivibrator into a state in which said capacitor means pilots said bistable multivibrator causing it to assume said second state.

* * * * *